Sept. 22, 1959 J. HENCHERT 2,905,124
METHOD OF ATTACHING A BAIL EAR
Filed Sept. 26, 1955 2 Sheets-Sheet 1
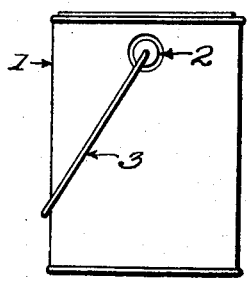
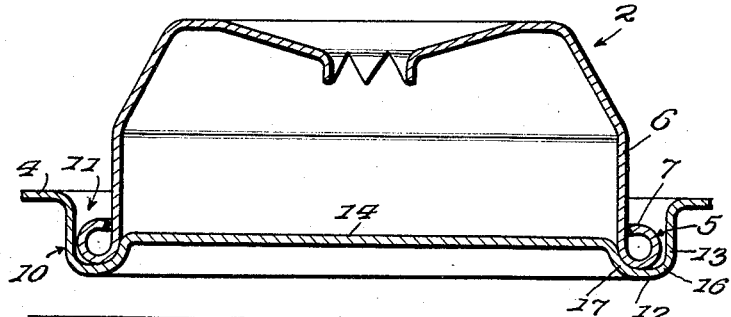
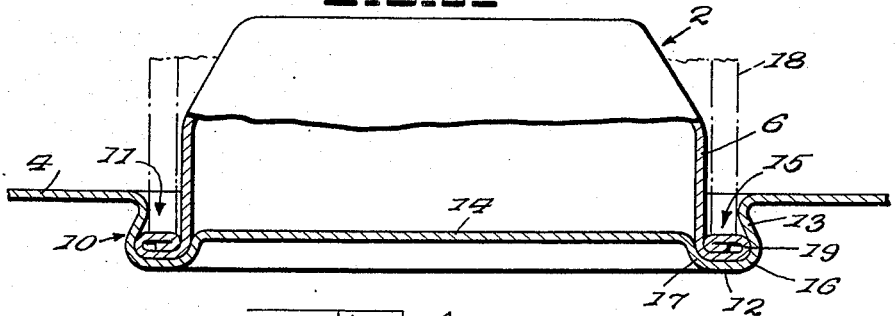
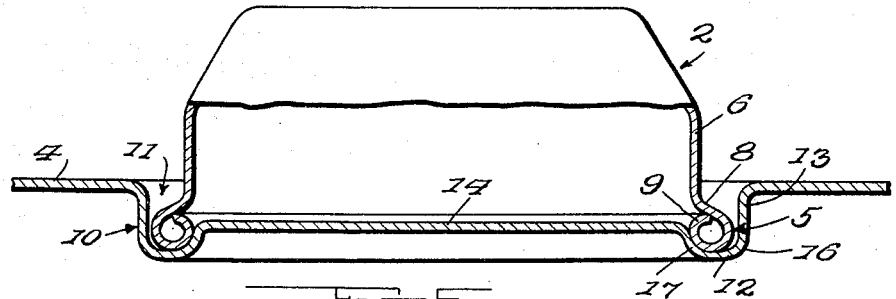
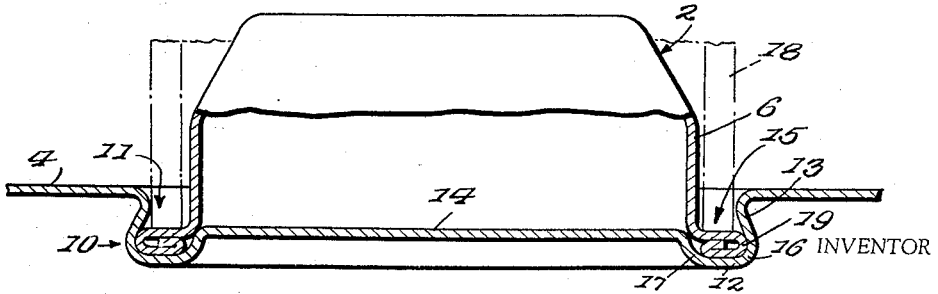
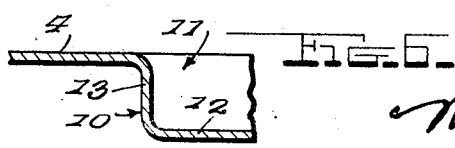
INVENTOR
John Henchert
BY
Mason, Porter, Diller & Stewart
ATTORNEYS Sept. 22, 1959     J. HENCHERT     2,905,124
METHOD OF ATTACHING A BAIL EAR
Filed Sept. 26, 1955     2 Sheets-Sheet 2
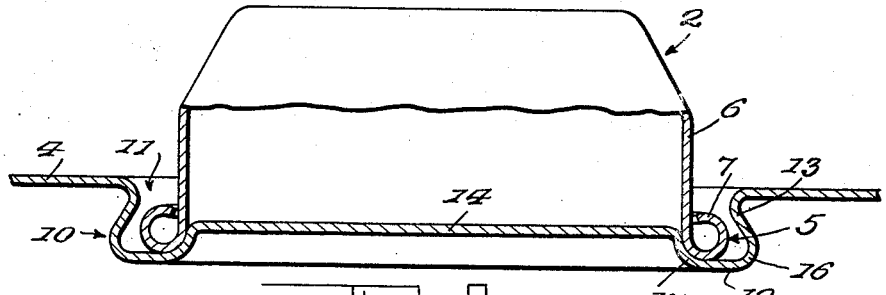
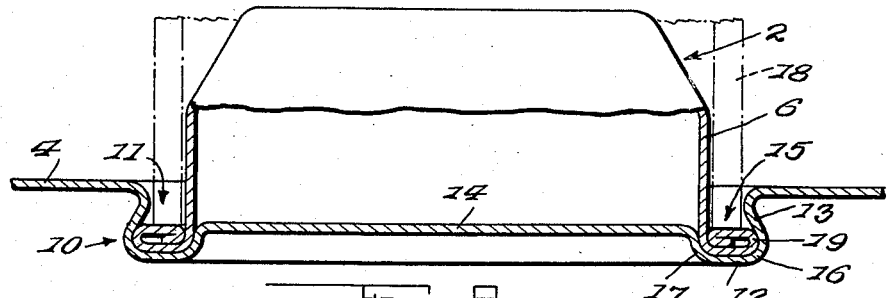
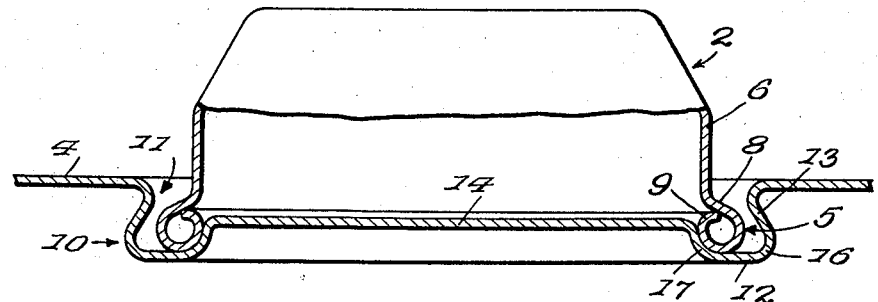
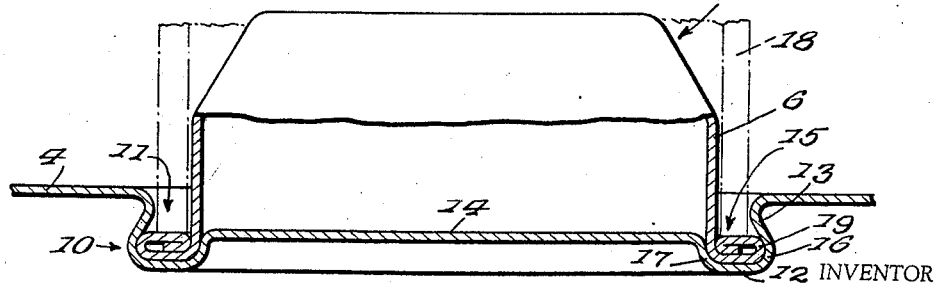
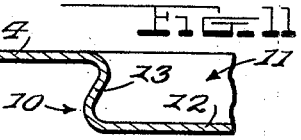
INVENTOR
John Henchert
BY
Mason, Porter, Diller & Stewart
ATTORNEYS United States Patent Office 2,905,124
Patented Sept. 22, 1959

2,905,124

METHOD OF ATTACHING A BAIL EAR

John Henchert, River Forest, Ill., assignor to Continental Can Company, Inc., New York, N.Y., a corporation of New York Application September 26, 1955, Serial No. 536,655

6 Claims. (Cl. 113—120)

Paint cans, painters' buckets and other sheet metal containers of the bucket type have long been equipped with ears for the attachment of carrying bails, and the present invention relates to the attachment of such ears to the body blanks from which the side walls of the containers are to be formed.

In the successful manufacture of such ear equipped containers, there are a number of important factors to be taken into consideration; one, the method should hold manufacturing time and cost to the minimum; two, it should be well adapted to mass production; three, it should be such as to prevent visible or hidden defects which could cause container leakage; four, it should be such that the attached ear will not interfere with shaping of the blank into container side wall form; and, five, it should produce a strong product capable of withstanding rough handling prior to and during use.

The present invention has aimed to fulfill the above stated requirements, both as to method of manufacture and as to structure of the ear equipped container.

The ears are formed of generally dome shape and each ear is provided at its base edge with an external, peripheral tubular bead. Each body blank is provided with a continuous wall for close concentric relation with the tubular bead of the associated domed ear. The domed beaded ear and blank are relatively assembled and the tubular bead and continuous wall placed in the aforesaid close concentric relation, and said tubular bead is then flattened in a direction to increase the radial dimension of said bead and force it into interlocking engagement with said continuous wall.

The above mentioned continuous wall may be cylindrical and when in this form it becomes deformed under the pressure exerted against it by the bead during flattening of the latter, thereby producing the desired interlocking relation of the wall and flattened bead. However, the wall may be preformed in the shape into which the aforesaid cylindrical wall will be deformed by the bead pressure, and the bead will then engage the preformed wall when said bead is flattened. In either instance, the bead presents a rounded edge to the wall with no danger of rupturing the latter. Moreover, in either case, the connection of the domed ear to the body blank is effected without the necessity of clinching the continuous bead engaging wall over the bead.

The aforesaid continuous bead engaging wall is preferably the side wall of a shallow recess formed by depressing a portion of the body blank, and the bottom of this recess is preferably formed with a boss which prohibits contraction of the bead radially of the domed ear during the bead flattening operation, thereby insuring forcible radial expansion of said bead into extremely tight interlocking engagement with said wall.

With the above and other objects in view that will hereinafter appear, the nature of the invention will be more clearly understood by reference to the following detailed description, the appended claims and the several views illustrated in the accompanying drawings.

In the drawings:

Figure 1 of the accompanying drawings is a side elevation showing a paint or similar can provided with bail ears in accordance with the present invention.

Figure 2 is an enlarged sectional view showing the preferred domed and beaded ear initially assembled with a recessed body blank in readiness for bead flattening to unite ear and blank.

Figure 3 is a view similar to Figure 2 showing the bead flattened and the previously cylindrical recess side wall deformed into interlocking engagement with the flattened bead.

Figures 4 and 5 are views similar to Figures 2 and 3 respectively but showing a construction in which the bead is formed by inward instead of outward curling of the base edge of the domed ear.

Figure 6 is a detail section of a portion of the recessed body blank showing that the boss on the recess bottom of the preceding views may be omitted.

Figures 7, 8, 9, 10 and 11 correspond to Figures 2 to 6, respectively, but disclose constructions in which the recess side wall is pre-shaped to engage the flattened bead.

In Figure 1, a conventional paint can 1 has been shown, said can having domed ears 2 secured thereto, in accordance with the invention, for the attachment of a carrying bail 3. All other views show one of the domed ears 2 and a portion of the body blank 4 from which the can wall is to be formed, in the positions which they preferably occupy during assembly, prior to shaping said body blank into can wall form.

In all examples of the invention herein disclosed, the sheet metal domed ear 2 is formed at its base edge with a continuous, external, tubular bead 5, and the side wall 6 of said domed ear is preferably of cylindrical form. In Figures 2 and 7, the bead 5 is formed by an outward curl 7, whereas in Figures 4 and 9 the metal is first turned outwardly at 8 and then inwardly curled at 9.

The sheet metal body blank 4, in all forms of the invention disclosed, is formed with a depressed portion 10 providing it with a shallow recess 11, said recess having a bottom 12 and a continuous side wall 13. The bottom 12 is formed with a boss 14 in all views except Figures 6 and 11, said boss being in concentric relation with the recess side wall 13. This recess side wall 13 is of an internal diameter slightly greater than the beaded end of the domed ear 2 and the external diameter of the boss 14 corresponds to the internal diameter of the beaded ear side wall 6.

In Figures 2, 4 and 6 the recess side wall 13 is of cylindrical form and becomes deformed to the downwardly flared shape of Figures 3 and 5 under the pressure exerted by the bead 5 during deforming of said bead into the flat shape shown at 15. In Figures 7 to 11, however, the recess side wall 13 is pre-shaped into acute angular relation with the recess bottom 12, giving it the same initial shape as the final shape of the cylindrical recess side wall. In either instance, a curved fillet 16 joins the recess side wall 13 and bottom 12, and another curved fillet 17 joins the boss 14 to said bottom 12.

In all cases in which the boss 14 is provided, the fillet 17 engages the inner periphery of the bead 5 when the ear 2 and blank 4 are brought into initially assembled relation. See Figures 2, 4, 7 and 9. The ear 2 is thus accurately positioned with its bead 5 resting evenly upon the recess bottom 12 in closely spaced concentric relation with the recess sides wall 13. With the ear 2 and blank 4 thus initially assembled, the bead 5 is flattened by means of a press, one member of which is shown in broken lines at 18 in Figures 3, 5, 8 and 10.

During bead flattening, if the recess side wall 13 be cylindrical as in Figures 2, 4 and 6, the radial expansion of the bead 5 caused by said flattening, exerts such pressure against said wall 13 as to flare the latter to the shape of Figures 3 and 5, thus tightly interlocking said side wall 13 with the flattened bead 15. If the recess side wall 13 be pre-flared as in Figures 7 to 11, flattening of the bead 5 (Figures 8 and 10) causes the flattened bead 15 to interlock tightly with said wall 13 but produces no further appreciable deformation of the latter. In either case, the union of ear 2 and blank 4 is effected without danger of puncturing or otherwise rupturing any portion of the blank 4, as the bead 5 has only smooth surfaces contacting with said blank. Moreover, the union is highly effective without requiring that the recess side wall be clinched over the flattened bead. It will be apparent by reference to Figures 3, 5, 8 and 10 of the drawings that in each instance the flattening of the tubular bead results in the provision of a doubled wall fold and the forcing thereof outwardly against the surrounding side wall defining the depressed portion 10.

In any form of the invention in which the boss 14 is employed, this boss holds the bead 5 against any contraction radially of the ear 2, during the bead flattening operation, thus increasing the radial expansion of said bead into extremely tight interlocking relation with the recess side wall 13.

In the completed structure (Figures 3, 5, 8 and 10), the transversely curved outer edge 19 of the flattened bead 15 tightly engages the fillet 16 but may yield slightly thereon during curving of the body blank 4 into cylindrical shape to form the container sidewall. The union of ear 2 and blank 4 will not therefore interfere with this operation and a truly cylindrical shape may be imparted to the container side wall.

From the foregoing it will be seen that novel and advantageous provision has been disclosed for attaining the desired ends. However, attention is invited to the possibility of making variations within the scope of the invention as claimed hereinafter.

I claim:

1. In a method of attaching a domed sheet metal bail attaching ear to a sheet metal body blank, the steps of forming the base of the domed ear with a peripheral tubular bead, forming the body blank with a continuous recessed bead engaging wall for close concentric relation with said tubular bead, relatively assembling the domed beaded ear and blank and disposing said tubular bead in close concentric relation with said continuous bead engaging wall, and flattening said tubular bead in a direction to radially and outwardly widen said bead and provide a doubled wall fold and force it into interlocking engagement with said wall.

2. The method defined in claim 1, in which said continuous bead engaging wall is preformed into acute angular relation with the blank to receive a portion of said bead when the latter is flattened.

3. In a method of attaching a domed sheet metal bail attaching ear to a sheet metal body blank, the steps of forming the base of the domed ear with a peripheral tubular bead, forming the body blank with a recess having a bottom and a continuous side wall, inserting the beaded end of the domed ear into said recess and disposing said tubular bead against said bottom in close relation with said continuous side wall, and flattening said tubular bead in a direction to radially and outwardly expand said bead and provide a doubled wall fold and force it into interlocking engagement with said side wall.

4. In a method of attaching a domed sheet metal bail attaching ear to a sheet metal body blank, the steps of forming the base of the domed ear with a peripheral tubular bead, forming the body blank with a recess having a bottom, a continuous side wall, and a boss on said bottom surrounded by and concentric with said side wall, inserting the beaded end of a domed ear into said recess and disposing said tubular bead on said bottom between said side wall and boss and substantially in contact with the latter so as to confine the domed ear and bead against radial inward movement, and flattening said tubular bead in a direction to radially and outwardly expand it and provide a doubled wall fold and force it into interlocking engagement with said side wall.

5. In a method of attaching a domed sheet metal bail attaching ear to a sheet metal body blank, the steps of forming the base of the domed ear with a peripheral tubular bead, forming the body blank with a recess having a bottom, a cylindrical side wall, and a boss on said bottom surrounded by and concentric with said cylindrical side wall, inserting the beaded end of the domed ear into said recess and disposing said tubular bead on said bottom between said cylindrical side wall and boss and substantially in contact with the latter, and so flattening said tubular bead as to outwardly expand it and provide a doubled wall fold and force it into contact with said cylindrical side wall and expand the latter by means of the bead pressure thereon.

6. In a method of attaching a domed sheet metal bail attaching ear to a sheet metal body blank, the steps of forming the base of the domed ear with a peripheral tubular bead, forming the body blank with a recess having a bottom, a continuous side wall at an acute angle to said bottom, and a boss on said bottom surrounded by and concentric with said side wall, inserting the beaded end of the domed ear into said recess and seating it against said bottom substantially against the periphery of said boss, and flattening said tubular bead in a direction to outwardly expand it and provide a doubled wall fold and force it into interlocking engagement with said side wall.

References Cited in the file of this patent

UNITED STATES PATENTS

| | | |
|---|---|---|
| 994,468 | Kane | June 6, 1911 |
| 1,264,521 | Hothersall | Apr. 30, 1918 |
| 1,783,927 | Rieke | Dec. 2, 1930 |
| 1,833,795 | Renshaw | Nov. 24, 1931 |
| 1,842,463 | Stollberg | Jan. 26, 1932 |
| 1,842,571 | Sebell | Jan. 26, 1932 |
| 1,851,938 | Rieke | Mar. 29, 1932 |
| 1,883,823 | Renshaw | Oct. 18, 1932 |
| 1,954,430 | Smith | Apr. 10, 1934 |
| 2,009,680 | Rollason | July 30, 1935 |
| 2,031,838 | Leonhart | Feb. 25, 1936 |
| 2,107,428 | Sexton | Feb. 8, 1938 |
| 2,293,610 | McQuinn | Aug. 18, 1942 |
| 2,430,035 | Thornburg | Nov. 4, 1947 |
| 2,630,964 | Scheldorf | Mar. 10, 1953 |

FOREIGN PATENTS

| | | |
|---|---|---|
| 562,082 | Great Britain | June 16, 1944 |